June 25, 1968 R. C. STORCK 3,390,252

ELECTRIC HEATING TOOL

Filed Oct. 22, 1965

INVENTOR.
ROBERT C. STORCK

BY Frank D. Prager

ATTORNEY

United States Patent Office 3,390,252
Patented June 25, 1968

3,390,252

ELECTRIC HEATING TOOL

Robert C. Storck, Warminster, Pa., assignor to Philco-Ford Corporation, Philadelphia, Pa., a corporation of Delaware Filed Oct. 22, 1965, Ser. No. 501,086
4 Claims. (Cl. 219—234)

ABSTRACT OF THE DISCLOSURE

Tool for "welding" wire structures to edges of thermoplastic boards, particularly in the building of "cordwood" modules. The tool uses a pair of U-shaped clips one facing the other and with partly overlapping arms, parallel edges of which rest on spaced portions of the wire structure. Electric current is passed through the two clips and thereby through a pair of wire segments, the arrangement being such that these segments rest on edges of the thermoplastic boards. The current passing through the wire segments then heats the underlying parts of the edges of the boards, thereby "welding" the wires to the thermoplastic boards.

This invention relates to the fabrication of electric circuit units. It provides a tool for building so-called "cordwood" modules.

Such modules have wires extending between and across edges of plastic boards or strips, some or all of the wires being axial leads of components disposed between the several boards or strips. The tool serves to secure wires to the edges of the boards.

It is usual to apply heat, or pressure, or both, for securing the wires in marginal slot regions of the plastic boards or strips. Heretofore, however, difficulties were encountered in the use of such techniques. Breakage of boards was frequent when the wires were pressed into slots. Damage to components was equally frequent when heat was applied to mold the lead wires into boards. It is an object of the invention to avoid these difficulties.

This has been achieved by means of a tool arranged to straddle the circuit boards, to engage the wires, and to apply to the wires and boards a combination of low pressure and intense but precisely localized heating. In a preferred embodiment of the invention the tool comprises two pairs of mutually spaced members disposed for contact with a pair of wires extending generally axially from a component and across a pair of edge regions of plastic boards. One pair of said members is provided for each axial wire. Very slight pressure applied to the tool suffices to bring edges of the four contact members into contact with the axial wires. On each side of the component the contact takes place at a pair of closely spaced points of the wires. A high electric current is then applied momentarily, heating the outer two of the three wire segments defined by said four points. Each of these outer segments, which are extremely short and limited, is in direct contact with a small portion of the plastic material in an edge portion of one of the plastic boards or strips. Heating and melting effects are thus applied to minute portions of plastic material, thereby causing the component and its wires to sink slightly into the boards. Undesirable side effects of the heating process, harming the electrical component, are avoided by suitable shorting-out, as will now be described with greater particularity.

Figure 1:
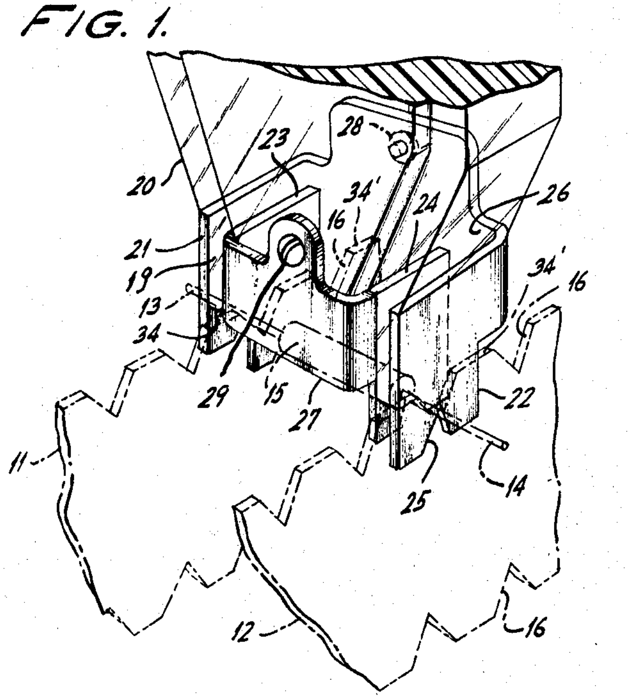
Figure 4:
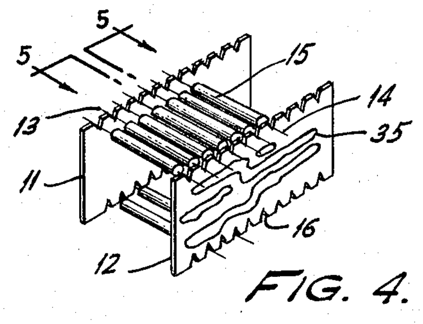
Figure 5:
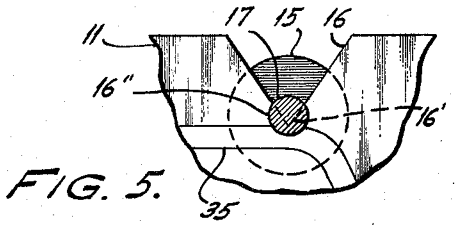
Figure 2:
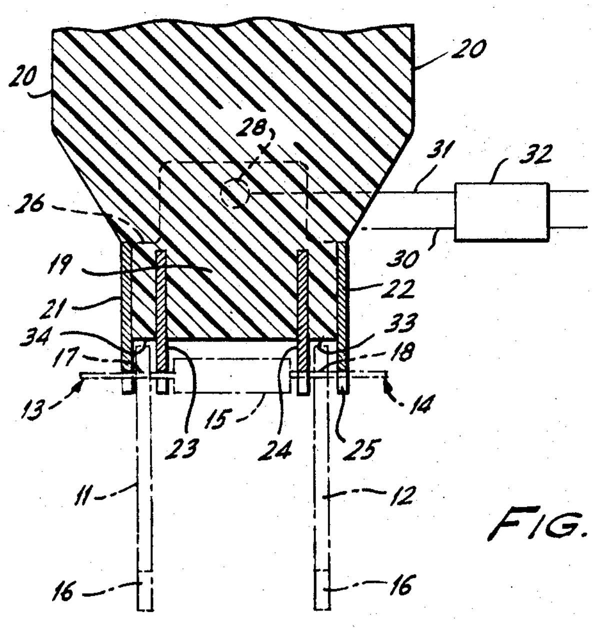
Figure 3:
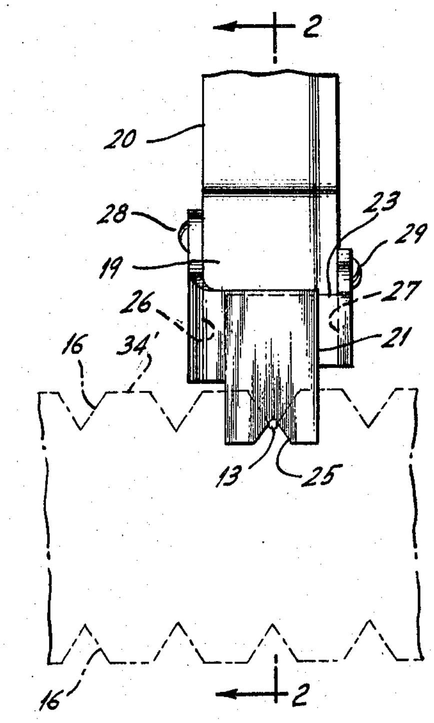

In the drawing FIGURE 1 is a fragmentary perspective view, on an enlarged scale, showing the new tool in operative position. FIGURES 2 and 3 are, respectively, sectional and side views of the tool in the same position, the section of FIGURE 2 being taken along line 2—2 in FIGURE 3. FIGURE 4 is a perspective view, taken on a smaller and more realistic scale and representing a module constructed with the aid of the new tool. FIGURE 5 shows a greatly enlarged detail of the module, in a view taken along line 5—5 in FIGURE 4.

The new tool is used in the manufacture of cordwood modules of the type shown in FIGURE 4. Such a module, which is of known type, comprises a pair of parallel boards 11, 12, and a system of wires 13, 14 extending axially from components 15. The components, as shown, are disposed between the boards, and the axial wires of the components are at right angles to said boards. These wires are further shown as having portions disposed in V-shaped slots 16 formed in the edges of the boards. For the purpose of component insertion the two parallel boards are so arranged that their slots face upwardly with their open ends, so that a component can be placed in proper position by dropping its axially extending wires into mutually aligned slots of the two boards. The new tool serves to fasten the so-positioned wires to the boards.

For this purpose the tool causes electric currents to pass only through very short segments of the component wires or leads, which are electrically resistive and which are disposed outside of and at least slightly spaced from component 15. These wire segments are most clearly shown in FIGURE 2 at 17, 18.

In order to pass electric current only through such a short wire segment, not through the entire component and wire system 13, 14, 15, the new tool comprises wire-contacting members, carried by a tool body 19 of electrically insulating material. In FIGURE 1 this tool body is shown as being of glass-like or transparent nature. This tool body is manipulated and intermittently transferred by means of a handle 20 thereon, to superimpose the tool over successive portions of the assembly of boards 11, 12, thereby to secure successive sets of component wires 13, 14, to the boards. The tool has a pair of outer electrical contact members 21, 22 and a pair of inner electrical contact members 23, 24, all of which are of rigid material and are rigidly assembled with the tool body. By means of this construction the two ends of a short wire segment 17, on one side of component 15, can be contacted respectively by contact members 21, 23 of the new tool, while segment 17 is and remains spaced from component 15 by member 23. Similarly wire segment 18 is spaced from the other side of component 15 by contact member 24, and is contacted by that member and the fourth contact member 25.

Each contact member is shown as comprising a small metallic plate having a downwardly opening groove, for instance of V-shape, in the lower edge thereof. The four plates are parallel to one another and their V-grooves are aligned with one another to match the axial direction of wires 13, 14. One of these V-grooves is most clearly shown in FIGURE 3, at 25. By applying slight downward pressure to tool handle 20, the operator establishes contact of the four contact members with four corresponding points on the two axial wires engaged by these V-grooves 25, see FIGURE 2.

While lower portions of contact members 21 to 24 with grooves 25 therein project slightly from the tool body, upper portions of these members are secured to said body. For this purpose outer contact plates 21, 22 are interconnected by a metallic web 26, so that elements 21, 22,

26 jointly constitute a U-shaped clip, the middle or web portion 26 of this clip being secured to one side of tool body 19. Similarly inner contact plates 23, 24 have web 27 interconnecting them as a clip which is held to the other side of the tool. The clips are nested in mutually facing relationship. They can be held to the insulative tool body by suitably molding them onto and partly into said body, or by the use of fasteners, not shown.

Each clip is made of electrically conductive metal and is shown as having a screw 28, 29 for connecting a wire 30, 31 thereto. These wires apply electrical potential to plates 21, 23 and thereby to the ends of the aforementioned short wire segment 17, thus causing electric current to flow through this wire segment. Similarly potential is applied to the ends of wire segment 18, by contact plates 22, 25, while no current flows through other wire sections or through the component, which is short-circuited by web 27, FIGURE 1.

The currents passing through short, local wire segments 17, 18 are regulated by suitable control and circuit means, generally indicated at 32 in FIGURE 2. Desirably, a current of rather high density is passed, at low voltage, through each local wire segment 17 and 18, for a very short time. This effects rapid, intense heating of these minute wire segments, and of the directly adjacent surfaces of V-slots 16 in circuit boards 11, 12.

The boards are conventionally made of plastic material, which can be softened readily by application of heat to said portions. Closely localized application of heat for the softening of minute portions of the boards, is achieved by the new type of electric heating or limited segments of axial component wires.

As indicated, it is a feature of the invention that component 15, as well as the elements or portions of component wires 13, 14 lying between this component and the heated wire segments 17, 18, is shorted-out by connector strip or web 27. In this way the possibility of deleterious heating of the component is minimized. Nor are these shorted-out elements heated to any appreciable degree by any transfer of heat from directly heated areas, when the heating of said areas is so closely localized and of such short duration as has been indicated.

Accordingly, the application of electric current provided in accordance with the invention has the effect of heating and plasticizing only minute edge portions 16′ of slots 16, whereon the small, directly heated wire segments initially rest (see FIGURE 5). A further result is that the wire and component unit sinks a minute vertical distance below these initial edge portions and down into a small region of softened, plastic material of the boards, still forming part of the edge of slot or groove 16. Such sinking in is promoted by the slight pressure applied by handle 20 to tool 19 and thereby to the wires. The small amounts of plastic material, softened and displaced by this process, close behind and above the wires, thus embedding and gripping the same.

A simple stop is provided for this sinking in of the wire and component unit. This stop comprises the lower surface of insulative tool body 19, best shown in FIGURE 2 at 33 and which is disposed between inner and outer contact plates 21, 22. A similar stop 34 is provided between plates 23, 24. Desirably the arrangement of downwardly facing grooves 25 in the wire contacting plates, relative to upwardly facing module grooves 16, is such that pursuant to predetermined heat-induced sagging in of the wire and component unit, further motion of this unit relative to boards 11, 12 is prevented by the then ensuing stop action between tool bottom surfaces 33 and rigid upper edges 34′ of the circuit boards.

At or about the time of this stop action the electric current control unit 32 desirably terminates the electric heating of wire sections or segments 17, 18. The previously plasticized board material in slot 16, gripping the wires, then hardens around the component wire sections. The hardened material engages these sections, as indicated in FIGURE 5 at 16″, thus holding the inserted component securely to the two boards.

Boards 11, 12 may have circuit paths 35 printed thereon, some of which are shown in FIGURES 4 and 5. Conventional solder contacts, not shown herein, can then be provided during or pursuant to the basic insertion of components and component wires by the new tool. Suitable application of heat, substantially as described, can also melt the solder. Such or other methods of soldering can be performed so as to contribute further to the provision of proper firmness of assembly between boards and components.

The new technique is unique in that it causes a component wire 13 to become locally embedded in and anchored to the supporting board or strip (FIGURE 5) by the combined application of very light mechanical pressure and intense but closely localized heating. Thereby the invention provides insertion of components with unique safety against breakage of board material and against thermal damage to the components. Thus the production of electronic modules, particularly of cordwood type with edge mounting of components (FIGURE 4), becomes usually simple and rapid, and at the same time unusually safe against the dangers formerly encountered.

While only a single embodiment of the invention has been fully described, the details thereof are not to be construed as limitative of the invention. The invention contemplates such variations and modifications as come within the scope of the appended claims.

I claim:

1. A tool for securing wires to and between mutually parallel edges of flat plastic members, said tool comprising:

an electrically insulative body;

two pairs of electrically conductive contact members secured to said body and having mutually parallel edges, the contact members of each pair being spaced one from the other to such extent that said edges of each pair can be contacted with adjacent wire portions spaced from one another by said flat plastic members, each pair of contact members being part of a metallic and electrically conductive clip rigidly secured to said insulative body and electrically short-circuiting the area between the contact members of said clip, and both clips being generally U-shaped and secured in mutually facing relationship to opposite sides of said insulative body; and means to pass electric current through each clip and pair of contact members and thereby through a pair of short wire segments defined by said wire portions, to heat said segments and thereby to heat limited, wire engaging edge regions of the plastic members.

2. A tool for securing wire structures to mutually spaced parallel edges of thermoplastic members, said tool comprising:

an electrically insulative body;

a pair of generally U-shaped clips disposed in mutually facing relationship, each clip having a pair of arms extending along opposite sides of said body to provide a pair of electric contact members, and each clip having a web rigidly secured to one end of said body and electrically short-circuiting the arms of the clip, the securement of the clips to said body being such that the two arms on each side of the body are mutually parallel and one slightly spaced from the other, to contact ends of short segments of the wire structure to be secured to said edges; and means to pass electric current through the pair of clips and the wire segments contacted thereby to heat said wire segments and thereby to heat limited edge regions of the thermoplastic material directly underlying said wire segments.

3. A tool as described in claim 2 wherein both arms of both clips project downwardly below the lower surface of said body.

4. A tool as described in claim 2 wherein both arms of both clips have wire engaging slots in their lower edges.

References Cited

UNITED STATES PATENTS

| | | | |
|---|---|---|---|
| 2,221,646 | 11/1940 | McPherson | 219—234 |
| 2,274,169 | 2/1942 | Schiff | 219—87 X |
| 2,513,431 | 7/1950 | Sell | 219—50 X |
| 2,667,557 | 1/1954 | Herzog | 219—68 |
| 2,807,705 | 9/1957 | Arrain | 219—68 |
| 3,263,057 | 7/1966 | Conti | 219—78 |
| 3,311,736 | 3/1967 | Burton et al. | 219—234 |

FOREIGN PATENTS

| | | |
|---|---|---|
| 1,376,753 | 9/1964 | France. |
| 814,608 | 6/1959 | Great Britain. |

ANTHONY BARTIS, *Primary Examiner.*